US011327706B2

(12) United States Patent  
Fain

(10) Patent No.: US 11,327,706 B2  
(45) Date of Patent: May 10, 2022

(54) INFRASTRUCTURE MODEL COLLABORATION VIA STATE DISTRIBUTION

(71) Applicant: Autodesk, Inc., San Rafael, CA (US)

(72) Inventor: Eric Alden Fain, San Rafael, CA (US)

(73) Assignee: AUTODESK, INC., San Rafael, CA (US)

( * ) Notice: Subject to any disclaimer, the term of this patent is extended or adjusted under 35 U.S.C. 154(b) by 208 days.

(21) Appl. No.: 15/440,910

(22) Filed: Feb. 23, 2017

(65) Prior Publication Data

US 2018/0239576 A1     Aug. 23, 2018

(51) Int. Cl.

| | | |
|---|---|---|
| *G06F 3/14* | (2006.01) |
| *H04L 67/02* | (2022.01) |
| *H04L 67/131* | (2022.01) |
| *G06F 30/13* | (2020.01) |
| *G06F 3/04817* | (2022.01) |
| *G06F 3/04815* | (2022.01) |
| *G06F 3/04847* | (2022.01) |
| *G06F 111/02* | (2020.01) |

(52) U.S. Cl.  
CPC ............ *G06F 3/1454* (2013.01); *G06F 30/13* (2020.01); *H04L 67/02* (2013.01); *H04L 67/38* (2013.01); *G06F 3/04815* (2013.01); *G06F 3/04817* (2013.01); *G06F 3/04847* (2013.01); *G06F 2111/02* (2020.01)

(58) Field of Classification Search  
CPC .. G06F 17/50; G06F 17/5004; G06F 17/5009; G06F 17/5086; G06F 17/5095; G06F 2217/04; G06F 3/1454; G06F 3/04815; G06F 3/04817; G06Q 10/101; G06Q 10/103; H04L 67/02

See application file for complete search history.

(56) References Cited

U.S. PATENT DOCUMENTS

| | | | |
|---|---|---|---|
| 6,789,109 B2 * | 9/2004 | Samra ..................... G06F 3/048 709/220 |
| 7,542,886 B2 * | 6/2009 | Storms ................ G06F 17/5004 700/97 |
| 8,819,180 B2 * | 8/2014 | Reeves .................... H04L 67/38 709/218 |
| 9,245,064 B2 * | 1/2016 | Loberg ................ G06F 17/5004 |
| 9,274,780 B1 * | 3/2016 | Velummylum ...... G06F 9/44505 |
| 9,712,622 B2 * | 7/2017 | Jayakeerthy ............ H04L 67/14 |
| 2008/0249756 A1 * | 10/2008 | Chaisuparasmikul ....................... G06F 17/5004 703/13 |

(Continued)

*Primary Examiner* — Alvin H Tan  
(74) *Attorney, Agent, or Firm* — Gates & Cooper LLP

(57) ABSTRACT

A method and system provide the ability to asynchronously collaborate on a model of an infrastructure project. The model is acquired and view settings for the model are captured. The view settings include a feature highlight that provides display attributes/settings for objects and/or features of the model, a camera position providing second settings relating to a camera view of the model, and a data view providing third settings regarding a view of the model data. The view settings are associated with a link. The link is transmitted/provided from a sender to a recipient. The link enables rehydration of a live model based on the captured view settings thereby presenting a state and view settings of the model specified by the sender.

21 Claims, 9 Drawing Sheets

(56) References Cited

U.S. PATENT DOCUMENTS

| | | | | |
|---|---|---|---|---|
| 2014/0074272 A1* | 3/2014 | Cowden, IV | ........... | G06F 17/50 |
| | | | | 700/97 |
| 2014/0380191 A1* | 12/2014 | Rotbaein | ............... | H04L 65/403 |
| | | | | 715/753 |
| 2016/0259630 A1* | 9/2016 | Roos | ......................... | G06F 8/36 |
| 2020/0128287 A1* | 4/2020 | Maimon | ................. | G06F 16/44 |

* cited by examiner

INFRASTRUCTURE MODEL COLLABORATION VIA STATE DISTRIBUTION

BACKGROUND OF THE INVENTION

1. Field of the Invention

The present invention relates generally to computer-aided design (CAD) application collaboration, and in particular, to a method, apparatus, and article of manufacture for enabling a designer to share a point in time of a model of an infrastructure project.

2. Description of the Related Art

When design decisions for a model are being made, in a collaborative setting, there is the need to communicate why the decision is being made. In other words, there is a need to communicate and share, with collaborators, anything that might be used to drive the design decision. To communicate the information, a designer would need to have someone at his or her desk (at the time the decision is made) to see the same circumstances for the design decision. Prior art systems fail to provide a dynamic method to convey/communicate such information while allowing a user to further manipulate and work with/in the model thereafter. Instead, prior art systems tend to share views of the model that are static such as renders, images, or video. While static versions may be helpful, they fail to provide the ability to inspect and interrogate the design problem in the live model. Accordingly, what is needed is a method and system that enables users to share a point in time of a model of an infrastructure project.

SUMMARY OF THE INVENTION

Embodiments of the invention overcome the problems of the prior art by allowing a designer to remotely and asynchronously share a point in time of a model of an infrastructure project with all of the same environmental settings captured including what features are visible, what kinds of analysis have been running, etc.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention capture a state of a model, with all of the environmental settings, including the position in the model, and the features that were being used by the designer. The captured state is embed into a shareable link (e.g., a uniform resource locator/identifier [URL/URI]) and/or entity that is distributed/transmitted to one or more users. The shareable link/entity can then be used (e.g., by downstream/receiving users) to open the model within the context of the designer's captured model state. The downstream/receiving users can then further explore the model and investigate other issues around the design problem in real time in actual model space.

Hardware Environment

Figure 1:
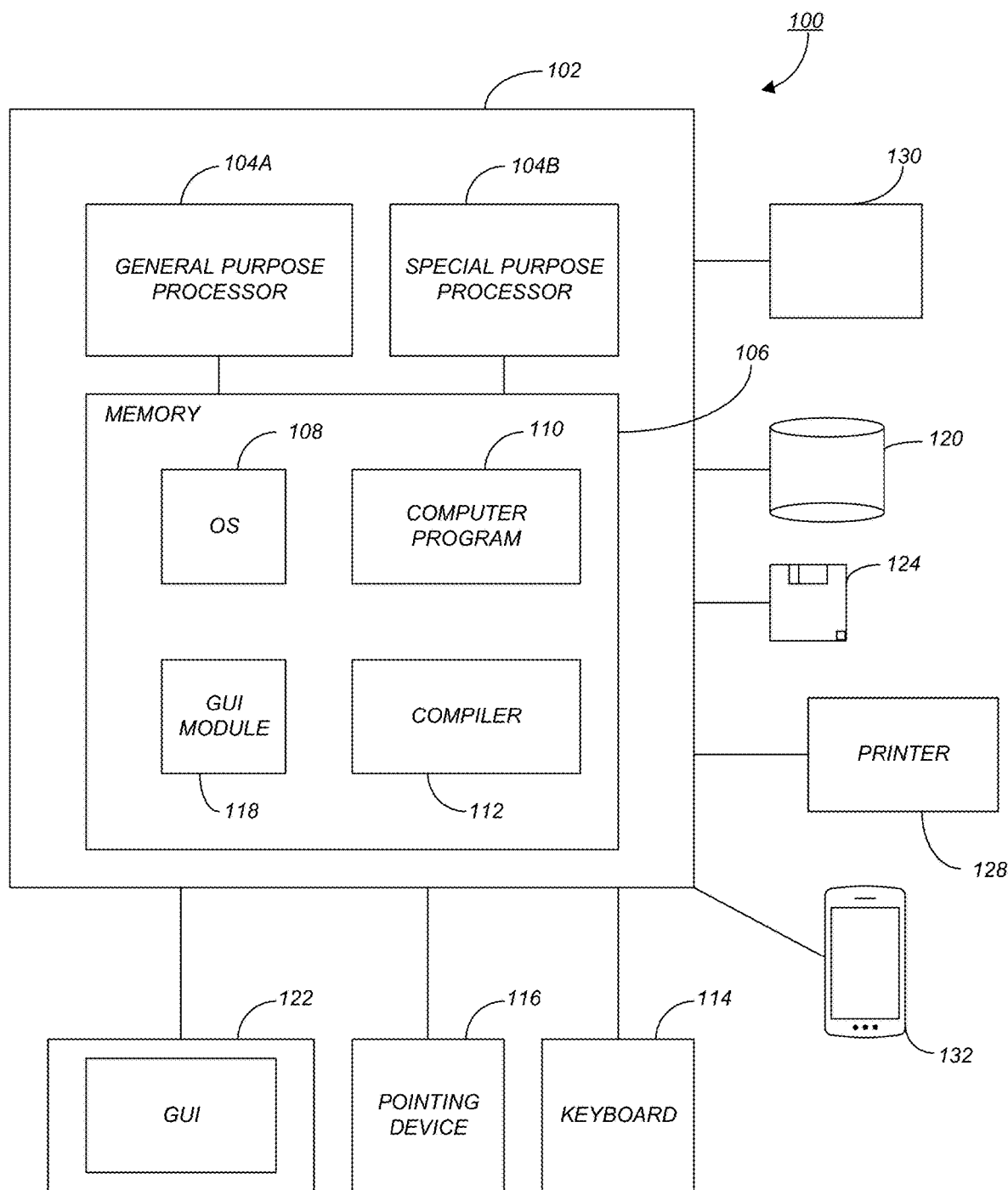
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
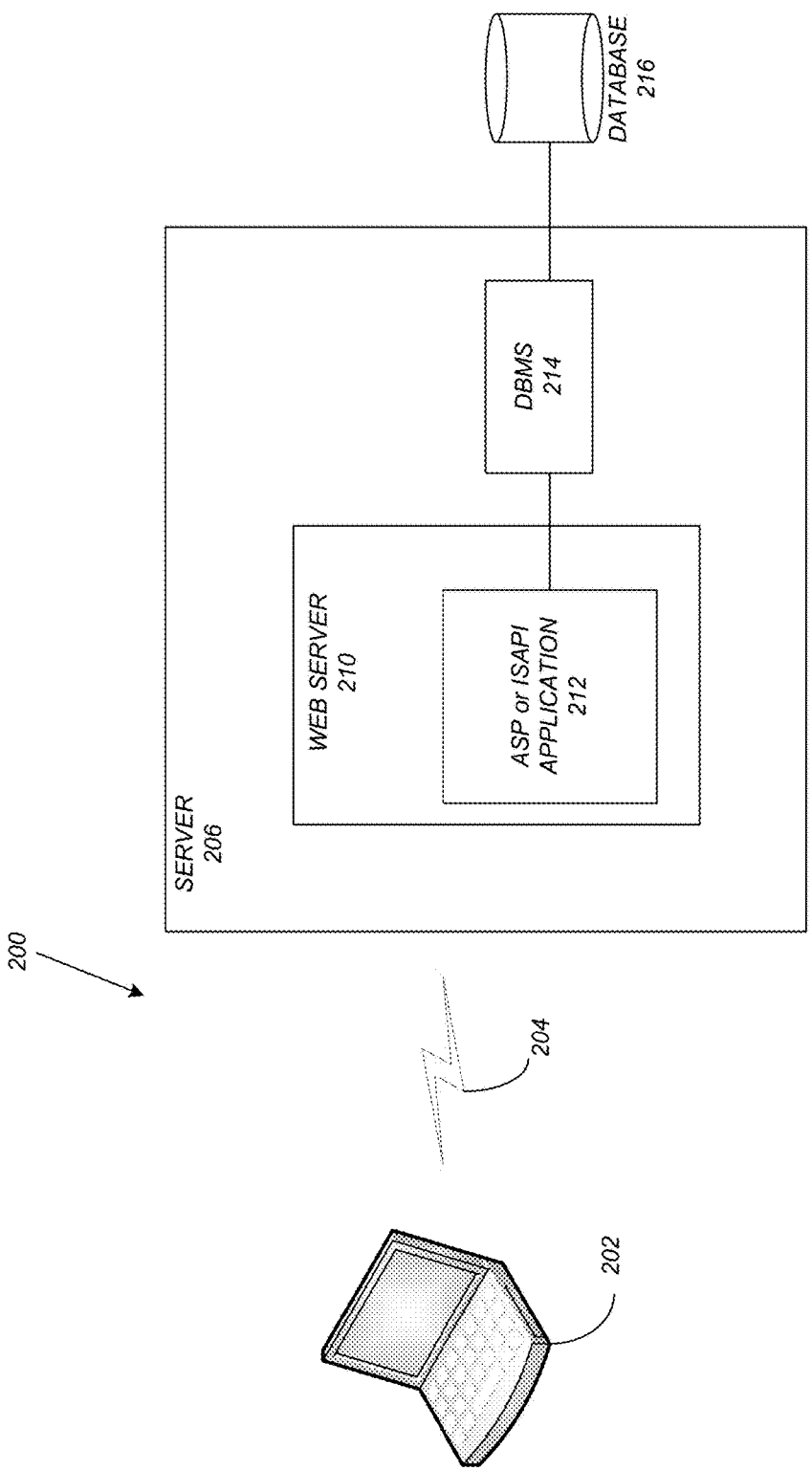
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Embodiments of the invention are implemented as a software application on a client 202 or server computer 206. Further, as described above, the client 202 or server computer 206 may comprise a thin client device or a portable device that has a multi-touch-based display.

Software Embodiments

Designers commonly explore various design options. During this exploration, a designer may turn on/off certain model application analysis and/or features. For example, a designer may turn on sun shadow analysis for a certain time of day, and/or may turn on line of sight analysis. In addition, the designer may have buildings and tree layers hidden, and may be using a particular version of the model.

The designer may desire input from another designer (e.g., at a different location) about a design problem found. To acquire such input, embodiments of the invention provide the ability for the user to forward a link/entity to other designers. The link/entity captures the contextual state of the model application and the model. Upon opening the link/entity, the recipient is able to view exactly the same state of the model, with all of the environmental settings, including the position in the model, with the features that were active by the original designer turned on, and the features the recipient was using turned off. Thereafter, the receiving designer can further explore the model and investigate other issues around the design problem in real time in actual model space so there is no coordination needed to set up the design review, nor is it static.

In embodiments of the invention, the link/entity includes/identifies the camera position, the features turned on/off, analysis results, navigation information, markup/comment information, etc. Thus, instead of sharing something that is static or may look different due to a different application environment setup, all participating collaborators can view the state of the infrastructure model from the perspective of the originating designer and may continue to work with and manipulate the model thereafter.

To enable the transmission of the model state, embodiments of the invention may utilize an infrastructure model that is database drive (e.g., the INFRAWORKS 360™ modeling application available from the assignee of the present application). The elements from within the database are used to populate the link/entity that is shared/distributed to the collaborating users. For example, in the INFRAWORKS 360 application, a scenegraph (or elements of the scenegraph) representing a model may be distributed.

The different elements of the state that are captured may include version control (that represents history and time), analysis results (that represents results of an analysis [e.g., an analysis to determine structural problems in a bridge design]), application settings (that represent user preferences), etc. Once the link/entity is received, the receiving collaborator may utilize the link/entity to bring up the model in the state defined by the link/entity.

Figure 3:
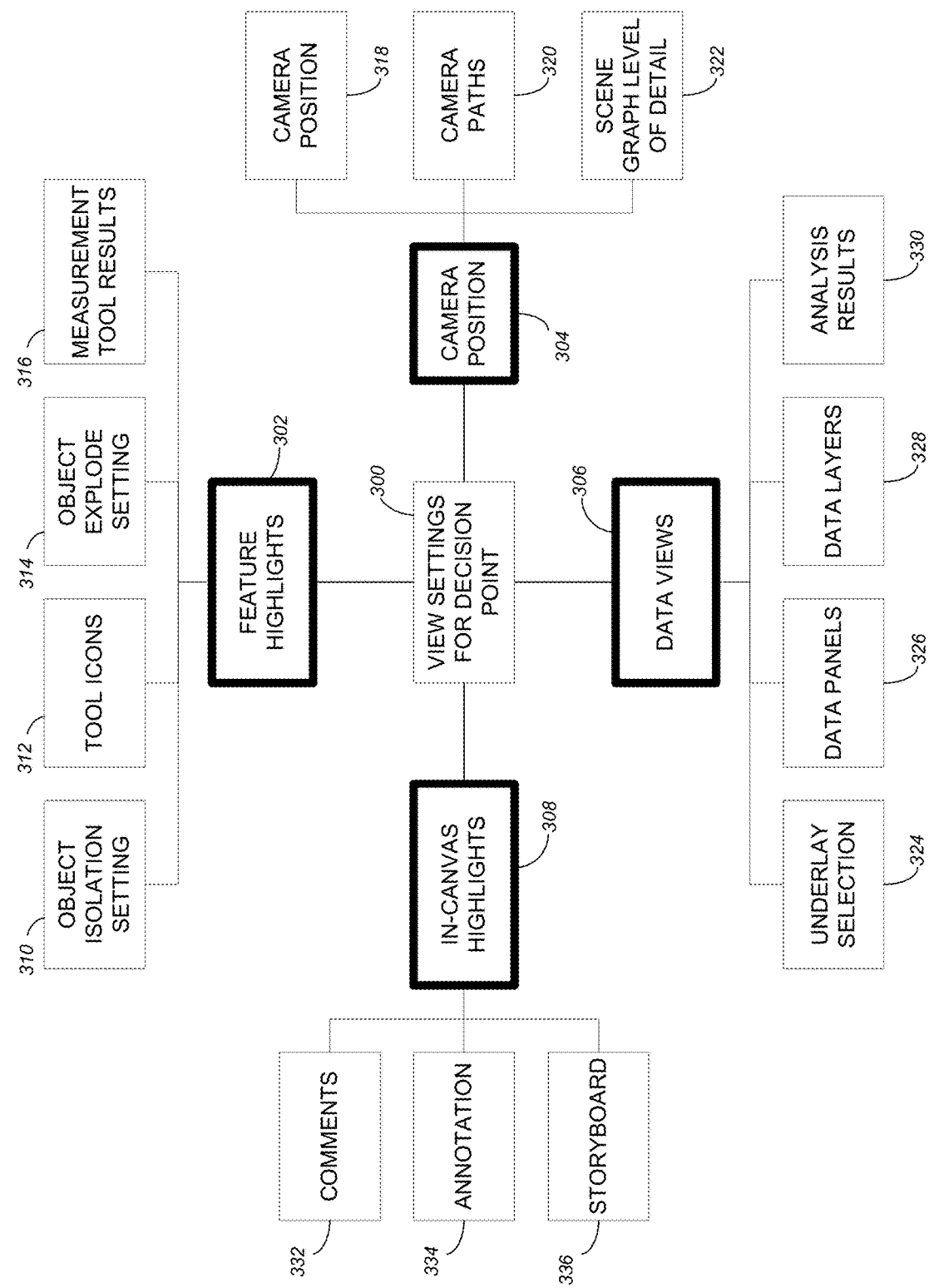
FIG. 3 illustrates an entity diagram for the different entities/attributes/elements that may be captured/transmitted to a recipient in accordance with one or more embodiments of the invention.

FIG. 3 illustrates an entity diagram for the different entities/attributes/elements that may be captured/transmitted to a recipient in accordance with one or more embodiments of the invention. In the center, the base entity/element 300 is that of the view settings at/for a decision point. In other words, at the point where a user would be going to make a decision, he/she may view the settings (e.g., that are about to be transmitted or have already been transmitted to the recipient).

The four categories 302-308 provide/identify the entities/elements/categories whose state can be captured. Such four categories include feature highlights 302, camera position 304, data views 306, and in-canvas highlights 308.

The feature highlights 302 are elements/settings for objects/features of the model. Feature highlights 302 include information such as objection isolation settings 310 (e.g., which objects have been isolated from other elements/objects for editing/viewing), tool icons 312 (e.g., the tool icons that are displayed), object explode settings 314 (e.g., which elements of one or more objects are exploded in order to view component elements such as the layer name, color, line type, etc.), and measurement tool results 316 (e.g., results from using the measurement tool to compute/view the distance between two points/objects).

The camera position 304 includes the position of the camera 318 (e.g., the viewing frustum and angle), camera paths/camera path settings 320 (a defined path [e.g., key frames, the speed to move between key frames, transitions, etc.] taken by a camera to view/simulate a view/model over time), and the scene graph level of detail 322 that is displayed.

The data views 306 include underlay selection 324 (e.g., settings determining whether an element contained in an underlay is selectable), data panels 326 (e.g., settings for a data panel that provides access to project files and folders), data layers 328 (e.g., settings for whether each layer in the model is on/off, coordinate system settings, etc.), and analysis results 330 (e.g., results from an analysis such as a heating and cooling loads analysis, solar studies, display styles and view settings for the analysis results, etc.). As used herein, an underlay is a file/image that is similar to an attached raster image in that it provides visual content but may not actually be part of the drawing file itself, but is linked to the drawing file through a path name. Underlay files are often reproductions of their source drawing, are not as precise as drawing files, and may show slight discrepancies in precision.

The in-canvas highlights 308 include comments 332, annotations 334, and storyboard 336 settings (e.g., camera height, regular or large storyboard view options, size of thumbnails, etc.).

FIGS. 4A-4J illustrate an exemplary collaboration workflow between two users that perform various changes/analysis of an infrastructure project model and asynchronously share a point in time of the model in accordance with one or more embodiments.

Figure 4A:
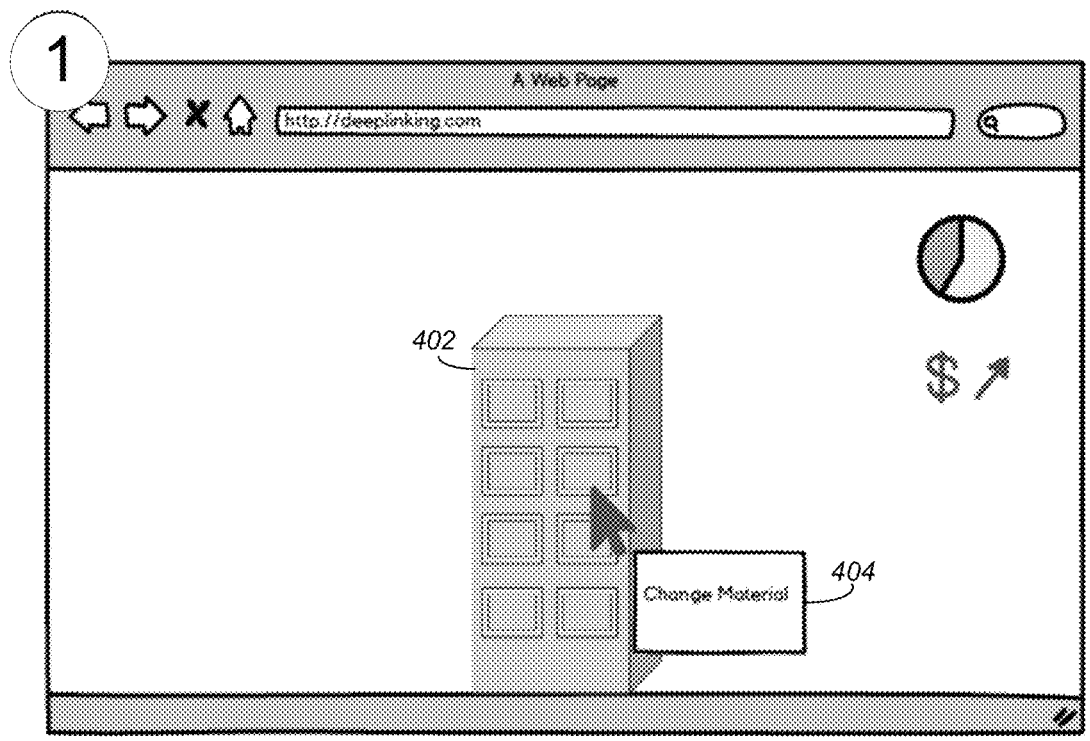
FIGS. 4A-4J illustrate an exemplary collaboration workflow between two users that perform various changes/analysis of an infrastructure project model and asynchronously share a point in time of the model in accordance with one or more embodiments.

In FIG. 4A, on an interactive webpage that enables a view of a 3D model, a first user, Brett, determines there is a need to bring the material cost of the building 402 back in line with the budget. Accordingly, Brett initiates the option to change the material cost 404.

Figure 4B:
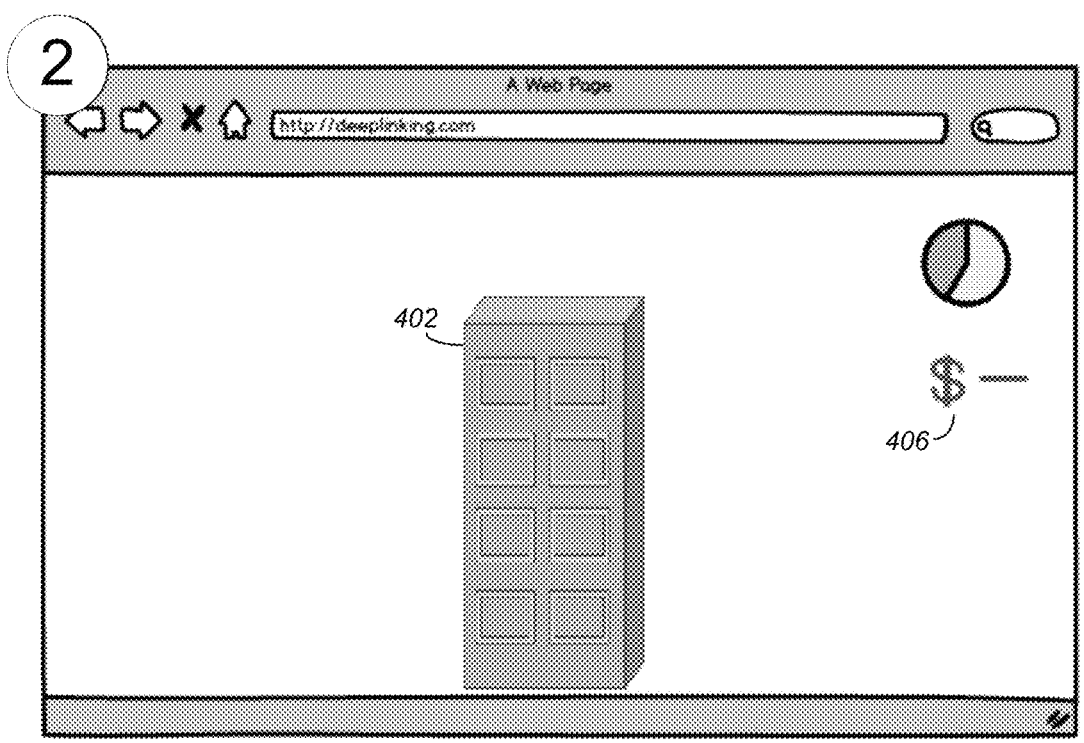

In FIG. 4B, the material of the building 402 has been changed and the display illustrates a cost reduction 406. Further analysis shows the change is a good decision for the material cost and the schedule.

Figure 4C:
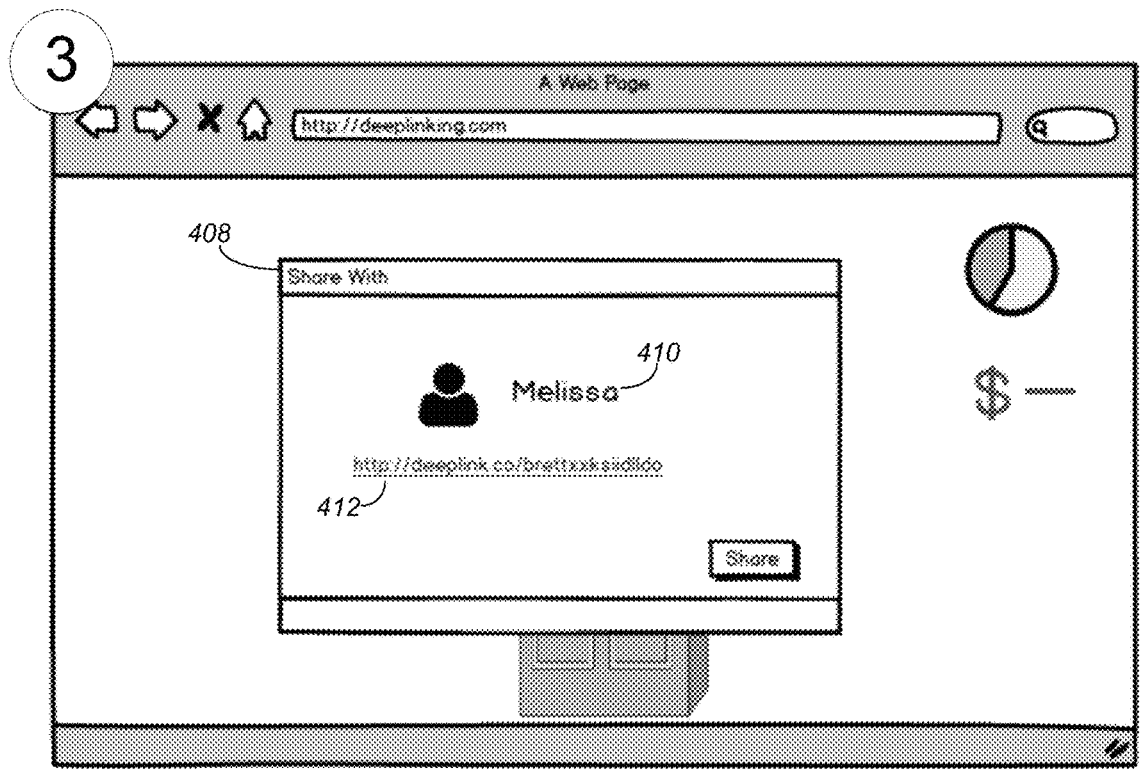

In FIG. 4C, Brett decides to send the results to his colleague Melissa for review. As illustrated, the "share with" dialog window 408 includes an identification of the recipient, Melissa 410, and the selectable link 412 (to the captured features/elements utilized when Brett changed the building material).

Figure 4D:
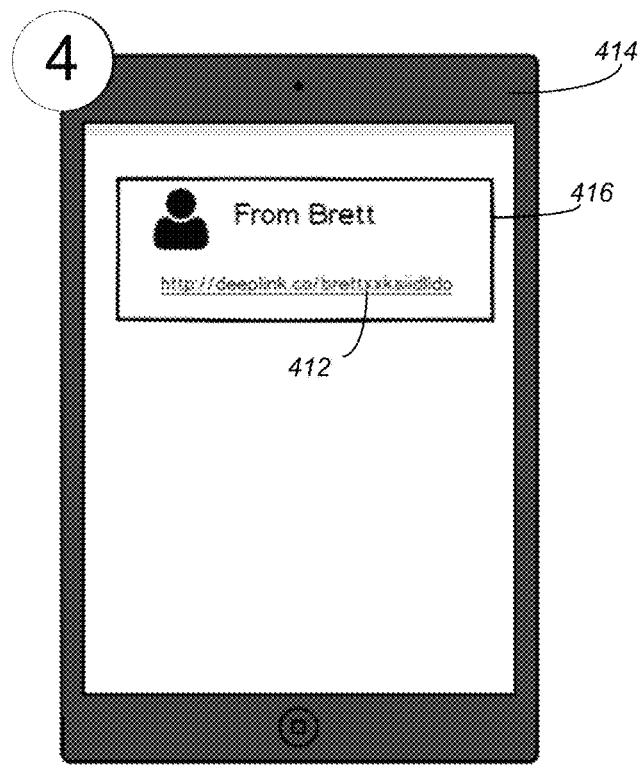

FIG. 4D illustrates the recipient view. On the recipient's device 414 (e.g., a mobile phone), the message/request 416 received by Melissa from Brett is displayed. The deep link URL 412 rehydrates the view from which Brett was making design decisions (e.g., from FIGS. 4A and 4B).

Figure 4E:
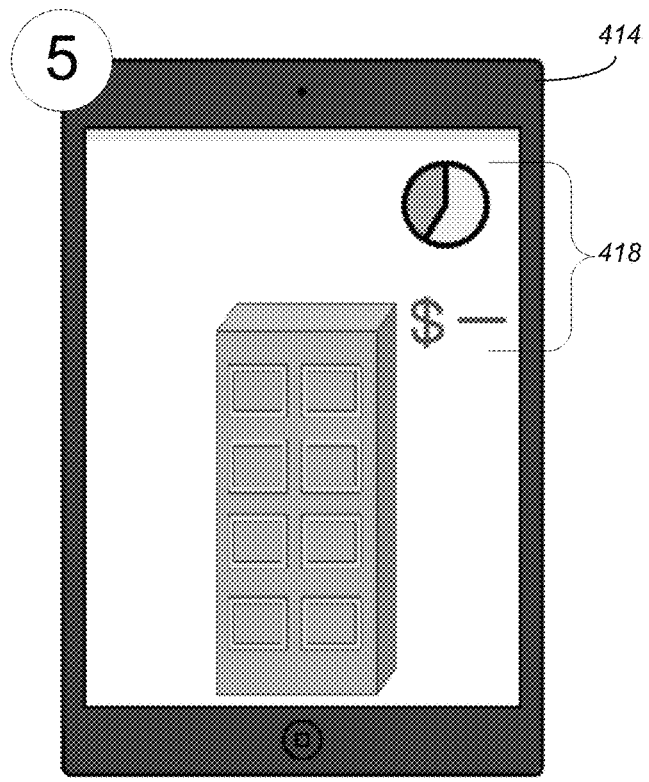

In FIG. 4E, the same metrics, tools, and analysis results 418 that Brett was reviewing (e.g., in FIGS. 4A and 4B) are shown to Melissa on her device 414, so that they can collaborate with a common understanding, without screen sharing, and in a live model rather than a view or photograph. The deep linking enables/provides access to the key factors impacting the design decisions that were made and allows for further exploration and analysis.

Figure 4F:
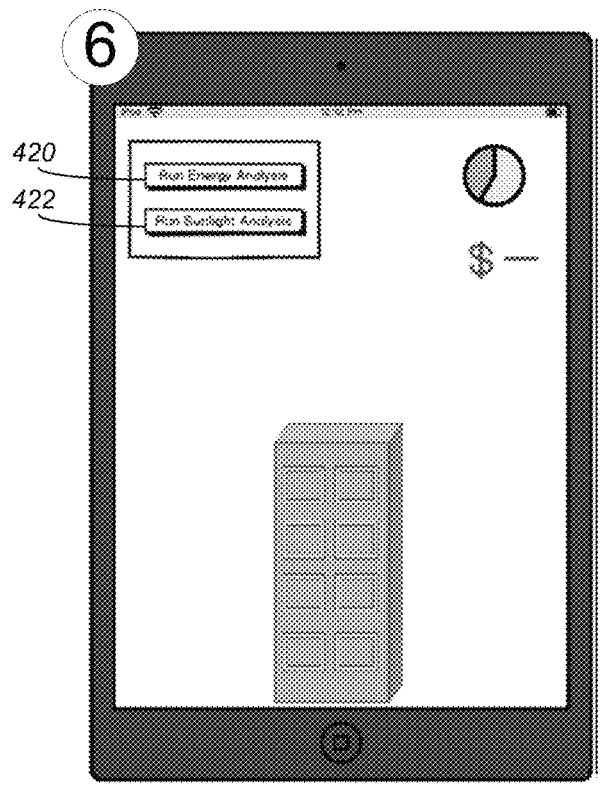

In FIG. 4F, Melissa wants to understand the impact outside just the material cost and the schedule—she wants to understand the overall impact. Accordingly, the options for running an energy analysis 420 and a sun shadow/sunlight analysis 422 are activated/selected.

Figure 4G:
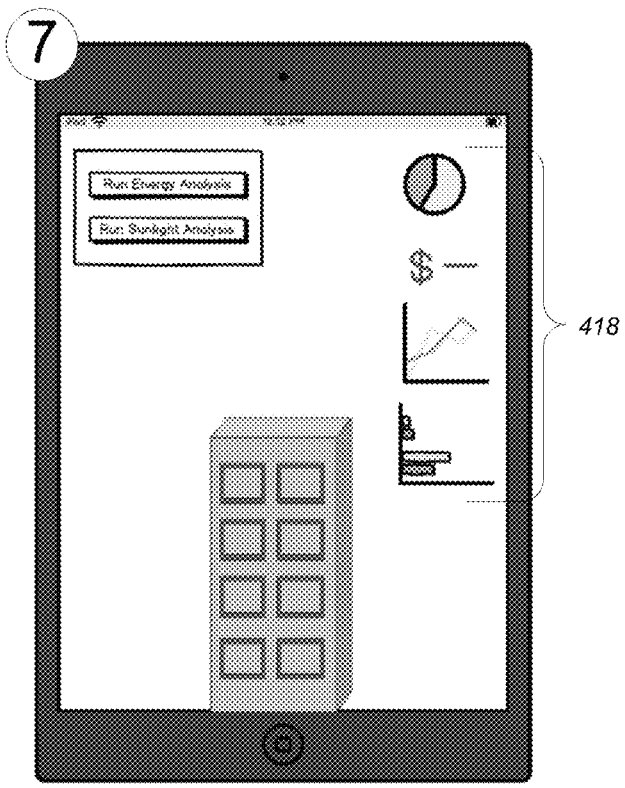

In FIG. 4G, Melissa has elected to run the energy analysis 420 and the sun shadow analysis 422. The analysis results (of analysis run by both Brett and Melissa) are displayed in area 418 and show that the long term cost is actually greater.

Figure 4H:
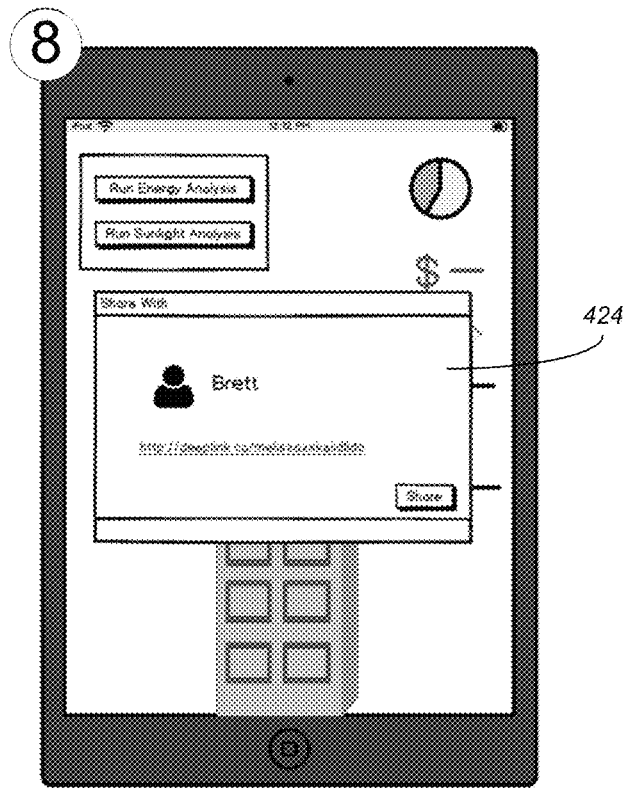

In FIG. 4H, Melissa has opted to share 424 these results back with Brett for his review.

Figure 4I:
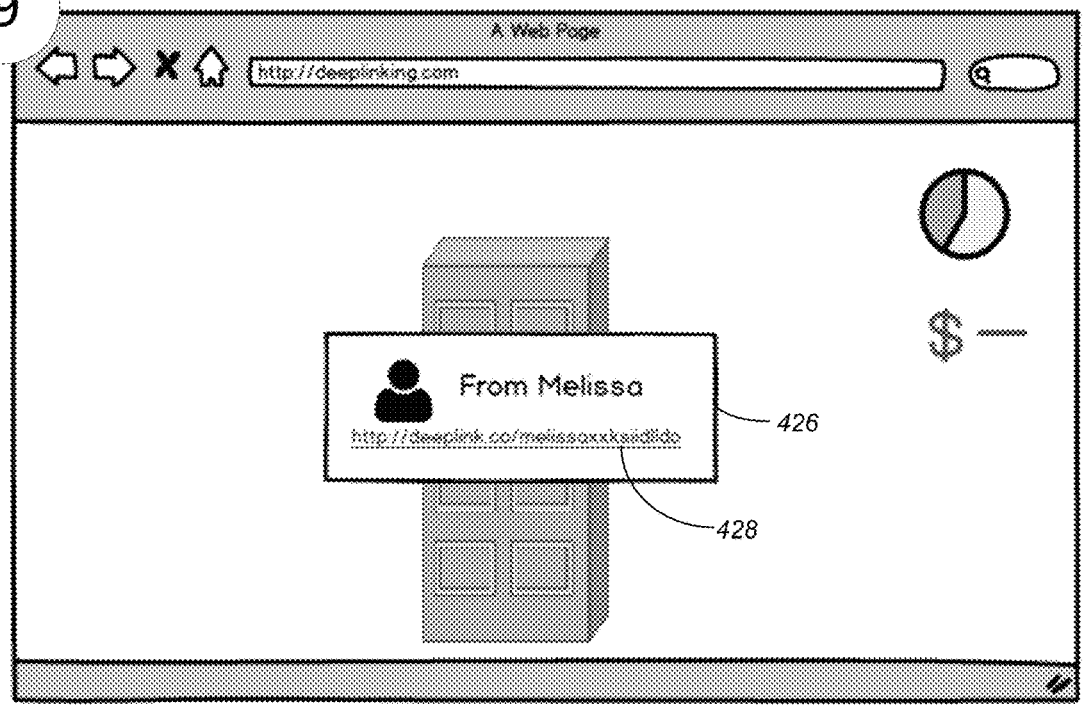

FIG. 4I illustrates the recipient view on Brett's device (e.g., in a web page), where Brett receives the notification 426, and can follow the deep link 428 to rehydrate the view sent by Melissa.

Figure 4J:
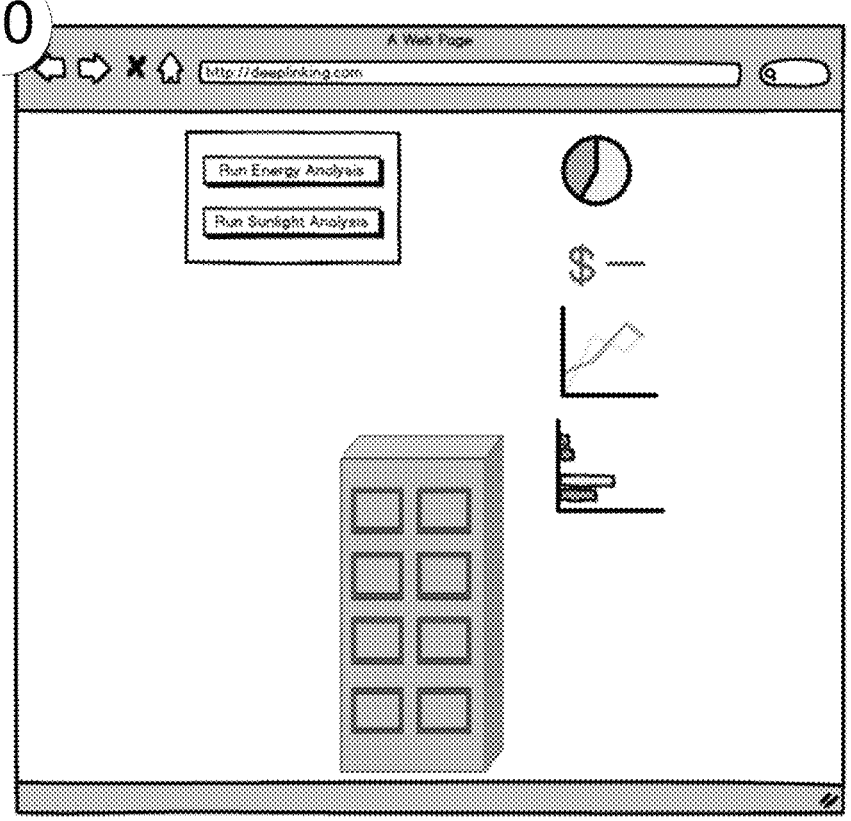

FIG. 4J illustrates the recipient's (Brett's) view after following the deep link. The view sent by Melissa is rehydrated and Brett can learn about the further analysis Melissa created.

Logical Flow

Figure 5:
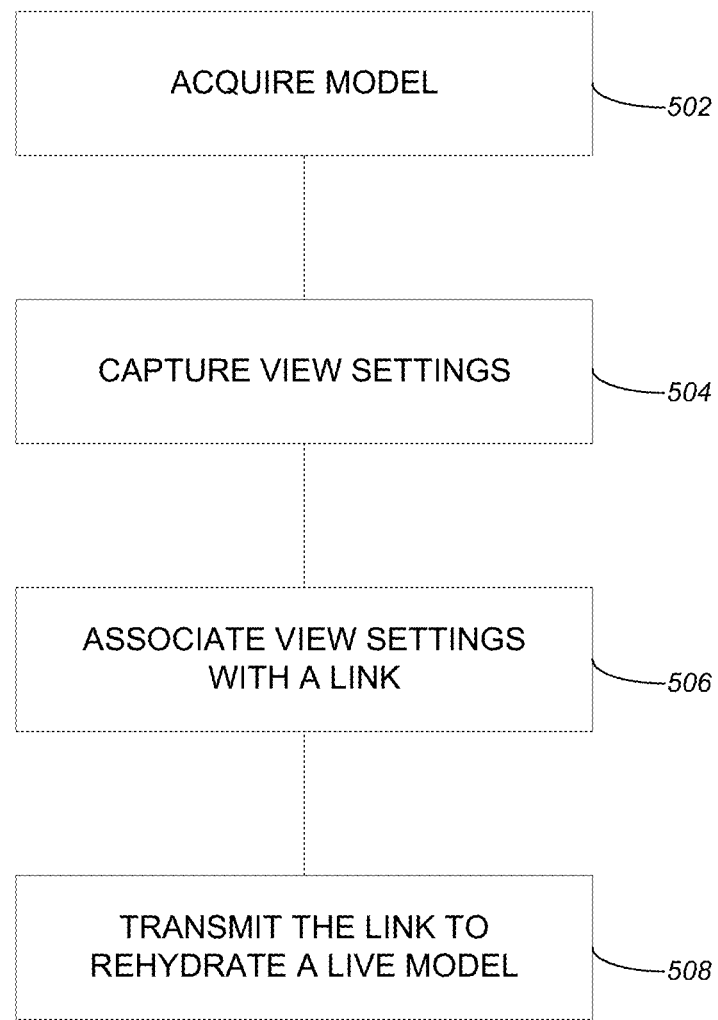
FIG. 5 illustrates the logical flow for asynchronously collaborating on a model of an infrastructure project.

FIG. 5 illustrates the logical flow for asynchronously collaborating on a model of an infrastructure project.

At step 502, the model of the infrastructure project is acquired.

At step 504, view settings for the model are captured. As described above with respect to FIG. 3, the view settings may include numerous settings/attributes. View settings may provide (1) a feature highlight that includes display attributes/settings for objects and/or features of the model; (2) a camera position that includes second settings relating to a camera view of the model; and (3) a data view that includes third settings regarding a view of the model data.

The feature highlight may include an object isolation setting that determines which objects have been isolated from other elements/objects, a tool icon, an object explode setting that determines which elements of the objects are exploded in order to view component elements, or a measurement tool result that provides a result from using a measurement tool to compute/view a distance between two points/objects.

The camera position may include a camera position view, a camera path, or a scene graph level of detail.

The data view may include an underlay selection identifying an underlay image that is selected, wherein the underlay image provides visual content but is not part of a drawing file that represents the model. The data view may further include a data panel that provides data panel settings for a panel that provides access to project files and folders, a data layer for data layer settings for each layer in the model, or an analysis result consisting of results from performing an analysis of the model.

The view settings may further include an in-canvas-highlight for exposing user-defined emphasis of the model. Such an in-canvas highlight may be a comment, an annotation, or a storyboard.

Further to the above, the view settings may also include a modification to the model made by the sender.

At step 506, the view settings are associated with a link.

At step 508, the link is transmitted/provided from a sender to a recipient. The link enables rehydration of a live model based on the captured view settings thereby presenting a state and view settings of the model specified by the sender (i.e., the same settings/circumstances the sender used when making a design decision).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to collaborate on a model design by capturing, into a link/entity, the state of an infrastructure model desired by a user, and sharing such a link/entity with other users who can activate the link/entity to replicate the model state. Thus, an exact state of an infrastructure model that has caused concern or needs review by others is returned/provided. There is no guesswork in setting up the space for review by a collaborator because the state is passed in the link/entity. Further, the state is live and not static such that additional analysis can be made, comments submitted, etc., from the same point of view as the original designer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for asynchronously collaborating on a model of an infrastructure project, comprising:
   (a) acquiring the model of the infrastructure project in a first computer aided design (CAD) modeling application executing on a sender's computer;
   (b) capturing a contextual state of the first CAD modeling application and view settings for the model, wherein the contextual state identifies features that were active in the first CAD modeling application, wherein:
       (1) the view settings comprise a feature highlight comprising display attributes/settings for objects and/or features of the model;
       (2) the view settings comprise a camera position comprising second settings relating to a camera view of the model; and
       (3) the view settings comprise a data view comprising third settings regarding a view of the model data;
       (4) the captured contextual state comprises first application settings for the first CAD modeling application;
   (c) associating the view settings and the captured contextual state with a link; and
   (d) transmitting the link from a sender to a recipient, wherein:
       (1) the link enables rehydration of the model, as a live model in a second CAD modeling application executing on a recipient's computer, based on the captured contextual state of the first CAD modeling application and the view settings;
       (2) the first application settings in the captured contextual state are used to configure second application settings of the second CAD modeling application;
       (3) the rehydration presents the live model in a same state with a same view settings as that specified by the sender; and
       (4) when rehydrated, the features that were active in the first CAD modeling application are turned on in the second CAD modeling application, and one or more features previously active in the second CAD modeling application are turned off.

2. The computer-implemented method of claim 1, wherein the feature highlight comprises:
   an object isolation setting that determines which objects have been isolated from other elements/objects;
   a tool icon;
   an object explode setting that determines which elements of the objects are exploded in order to view component elements; or
   a measurement tool result comprising a result from using a measurement tool to compute/view a distance between two points/objects.

3. The computer-implemented method of claim 1, wherein the camera position comprises a camera position view, a camera path, or a scene graph level of detail.

4. The computer-implemented method of claim 1, wherein the data view comprises:
   an underlay selection identifying an underlay image that is selected, wherein the underlay image provides visual content but is not part of a drawing file that represents the model;
   a data panel comprising data panel settings for a panel that provides access to project files and folders;
   a data layer comprising data layer settings for each layer in the model; or
   an analysis result comprising results from performing an analysis of the model.

5. The computer-implemented method of claim 1, wherein the view settings further comprise an in-canvas-highlight for exposing user-defined emphasis of the model.

6. The computer-implemented method of claim 5, wherein the in-canvas highlight comprises a comment, an annotation, or a storyboard.

7. The computer-implemented method of claim 1, wherein the view settings further comprise a modification to the model made by the sender.

8. A system for asynchronously collaborating on a model of an infrastructure project in a computer system comprising:
   (a) a computer having a processor, a memory and a data storage device coupled thereto; and
   (b) a first computer aided design (CAD) modeling application executing on the computer, wherein the CAD modeling application:
       (a) acquires the model of the infrastructure project;
       (b) captures a contextual state of the first CAD modeling application and view settings for the model, wherein the contextual state identifies features that were active in the first CAD modeling application, and wherein:
           (1) the view settings comprise a feature highlight comprising display attributes/settings for objects and/or features of the model;
           (2) the view settings comprise a camera position comprising second settings relating to a camera view of the model; and
           (3) the view settings comprise a data view comprising third settings regarding a view of the model data;
           (4) the captured contextual state comprises first application settings for the first CAD modeling application;
       (c) associates the view settings and the captured contextual state with a link; and
       (d) transmits the link from a sender to a recipient, wherein:
           (1) the link enables rehydration of the model, as a live model in a second CAD modeling application executing on a recipient's computer, based on the captured contextual state of the first CAD modeling application;
           (2) the first application settings in the captured contextual state are used to configure second application settings of the second CAD modeling application;
           (3) the rehydration present the live model in a same state with a same view settings as that specified by the sender; and (4) when rehydrated, the features that were active in the first CAD modeling application are turned on in the second CAD modeling application, and one or more features previously active in the second CAD modeling application are turned off.

9. The system of claim 8, wherein the feature highlight comprises:
    an object isolation setting that determines which objects have been isolated from other elements/objects;
    a tool icon;
    an object explode setting that determines which elements of the objects are exploded in order to view component elements; or
    a measurement tool result comprising a result from using a measurement tool to compute/view a distance between two points/objects.

10. The system of claim 8, wherein the camera position comprises a camera position view, a camera path, or a scene graph level of detail.

11. The system of claim 8, wherein the data view comprises:
    an underlay selection identifying an underlay image that is selected, wherein the underlay image provides visual content but is not part of a drawing file that represents the model;
    a data panel comprising data panel settings for a panel that provides access to project files and folders;
    a data layer comprising data layer settings for each layer in the model; or
    an analysis result comprising results from performing an analysis of the model.

12. The system of claim 8, wherein the view settings further comprise an in-canvas-highlight for exposing user-defined emphasis of the model.

13. The system of claim 12, wherein the in-canvas highlight comprises a comment, an annotation, or a storyboard.

14. The system of claim 8, wherein the view settings further comprise a modification to the model made by the sender.

15. A computer-implemented method for asynchronously collaborating on a model of an infrastructure project, comprising:
    (a) receiving a link from a sender; and
    (b) activating the link, wherein the activating rehydrates, in a second computer aided design (CAD) modeling application executing on a recipient's computer, the model as a live model of the infrastructure project based on captured contextual state of a first CAD modeling application and view settings associated with the link, thereby presenting the live model in a same state and same view settings of the model specified by the sender in the first CAD modeling application executing on a sender's computer, wherein the captured contextual state identifies features that were active in the first CAD modeling application, wherein the captured contextual state comprises first application settings for the first CAD modeling application, and wherein:
    (1) the view settings comprise a feature highlight comprising display attributes/settings for objects and/or features of the model;
    (2) the view settings comprise a camera position comprising second settings relating to a camera view of the model;
    (3) the view settings comprise a data view comprising third settings regarding a view of the model data;
    (4) the first application settings in the captured contextual state are used to configure second application settings of the second CAD modeling application; and
    (5) when rehydrated, the features that were active in the first CAD modeling application are turned on in the second CAD modeling application, and one or more features previously active in the second CAD modeling application are turned off.

16. The computer-implemented method of claim 15, wherein the feature highlight comprises:
    an object isolation setting that determines which objects have been isolated from other elements/objects;
    a tool icon;
    an object explode setting that determines which elements of the objects are exploded in order to view component elements; or
    a measurement tool result comprising a result from using a measurement tool to compute/view a distance between two points/objects.

17. The computer-implemented method of claim 15, wherein the camera position comprises a camera position view, a camera path, or a scene graph level of detail.

18. The computer-implemented method of claim 15, wherein the data view comprises:
    an underlay selection identifying an underlay image that is selected, wherein the underlay image provides visual content but is not part of a drawing file that represents the model;
    a data panel comprising data panel settings for a panel that provides access to project files and folders;
    a data layer comprising data layer settings for each layer in the model; or
    an analysis result comprising results from performing an analysis of the model.

19. The computer-implemented method of claim 15, wherein the view settings further comprise an in-canvas-highlight for exposing user-defined emphasis of the model.

20. The computer-implemented method of claim 19, wherein the in-canvas highlight comprises a comment, an annotation, or a storyboard.

21. The computer-implemented method of claim 15, wherein the view settings further comprise a modification to the model made by the sender.

* * * * *